W. M. HORD.
NUT LOCK.
APPLICATION FILED FEB. 11, 1909.
947,680.
Patented Jan. 25, 1910.
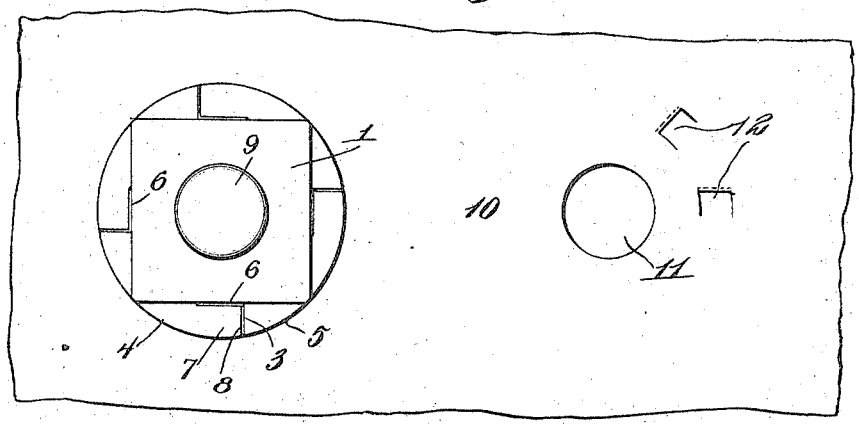
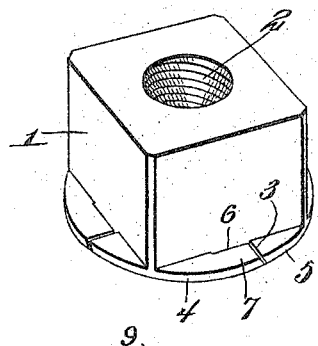
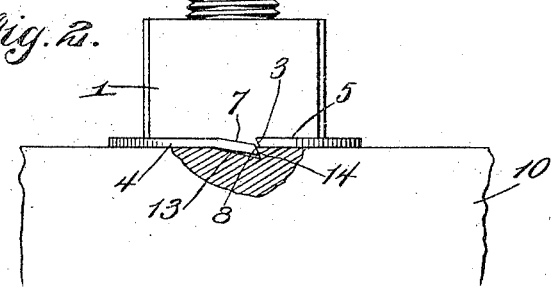
Witnesses
Inventor
Waverly M. Hord
By Victor J. Evans
Attorney

UNITED STATES PATENT OFFICE.

WAVERLY M. HORD, OF WARRENTON, VIRGINIA.

NUT-LOCK.

947,680.  Specification of Letters Patent.  Patented Jan. 25, 1910.

Application filed February 11, 1909. Serial No. 477,319.

*To all whom it may concern:*

Be it known that I, WAVERLY M. HORD, a citizen of the United States, residing at Warrenton, in the county of Fauquier and State of Virginia, have invented new and useful Improvements in Nut-Locks, of which the following is a specification.

This invention relates to improvements in nut locks, contemplating particularly a construction of lock nut which may be easily and inexpensively manufactured, and which is adapted to engage and interlock with the object against which it bears to hold it firmly against retrograde rotation, the construction of the locking means of the nut being such as to permit release of the same when desired to allow the nut to be turned off the bolt when it is desired to replace or repair the parts secured thereby.

The object of the invention is to provide a nut of this character by which the aforesaid advantages are obtained, and to this end the invention consists of the features of construction hereinafter fully described and claimed, reference being had to the accompanying drawing, in which:—

Figure 1 is a side elevation showing the application of the invention. Fig. 2 is a plan view of the same, partially in section. Fig. 3 is a perspective view of the nut.

Referring to the drawing, 1 designates the body of the nut, which is of square or other angular form, and provided with the usual threaded passage 2. Each of the sides of this nut is provided at its base or bearing portion with a segmental flange divided by a radial slit 3 to form portions 4 and 5. These portions 4 and 5 provide extended bearing elements, one of which is relatively longer than the other. The inner half of the portion 4 is separated from the body of the nut by a longitudinal slit or incision 6, and forms a locking tongue 7 adapted to be bent at an angle beyond the bearing face of the nut and provided with a beveled end 8, as clearly shown in Fig. 2. The flanges are left untempered like the body of the nut so that the tongues, instead of being of a spring nature, are of a malleable enough character to be bent into the acting position described and back therefrom into the plane of the flange and to retain its position, so that the tongues may be bent at a proper angle for use and restored to normal position when it is desired to render them inoperative for the removal of the nut from the bolt.

The nut is applied in the usual way to a fastening bolt 9 and is turned up to bring its bearing face and flanges into contact with the side of the object 10 to be secured, which object may be a fish plate or other element and provided with one or more openings 11 for the passage of a corresponding number of bolts. The said face of the object is provided on an arc concentric with each bolt opening with one or more locking recesses 12, each having an inclined base wall 13 and an undercut or beveled shoulder at one end thereof. These recesses are adapted to receive the bent locking tongues 7 of the nut, which are designed to bear more or less against the inclined walls 13 with their beveled ends 8 engaging the shoulders 14 to lock the nut when fully applied against retrograde rotation, thus preventing any possibility of the nut becoming loose and working back on the bolt through vibration of the parts or other causes. According to the arrangement and number of locking tongues and recesses employed, the tongues may be made operative to lock the nut on each eighth, quarter or half revolution or any other fraction of a complete revolution, so that any desired fineness of degree in the adjustment of the nut and its locking action may be secured. Either tongue being in action to secure the nut against backward movement, a release of said tongue may be effected by the use of a tool to bend the same back into the plane of the flange or by turning up the nut to a greater degree so that it will ride out of the recess and be bent back by contact with the surface of the object 10, thus allowing the nut to be turned off without interference from the tongue which in such action will ride over the recesses.

By the use and arrangement of a plurality of tongues as shown, any one of the tongues disposed opposite a recess when the nut is fully screwed up may be bent into said recess to hold the nut from backward movement. The ease of operation in bending an acting tongue back to release the nut as described allows the nut to be readily slackened or removed from the bolt in making repairs or replacing old parts with new ones. The described construction of the nut also enables the same to be manufactured at a comparatively low cost and dispenses with the use of washers and other auxiliary locking devices.

The cut or slit 3 extends inwardly to the plane of the side of the nut, thence along the angle formed between said side and the flange for a short distance to provide the bendable tongue 7. The cut 3 inclines to the plane of the flange to provide a biting edge to the tongue and a lip on the remaining portion 5 of the flange, said lip overhanging the end of the tongue and limiting its movement when bent back to normal position, thus forming a stop.

Having thus fully described the invention, what is claimed as new, is:—

A lock nut having a plurality of sides formed with integral untempered basal flanges, each flange having a cut extended inwardly from its outer edge to the plane of the side of the nut, thence along the angle formed between the side of the nut and the flange for a short distance to provide a tongue which is bendable, the inwardly extending cut being formed on an angle to the plane of the flange to provide a biting edge to the tongue, and a lip on the remaining portion of the flange to overhang the end of the tongue and limit its movement when bent back to normal position.

In testimony whereof I affix my signature in presence of two witnesses.

WAVERLY M. HORD.

Witnesses:
W. E. PRICE,
ARTHUR M. FANT.